E. R. AVERY.
WHEEL PULLER.
APPLICATION FILED JAN. 26, 1920.

1,357,136.

Patented Oct. 26, 1920.
2 SHEETS—SHEET 1.

Inventor:
E. R. Avery.
by Wilkinson & Giusta,
Attorneys.

E. R. AVERY.
WHEEL PULLER.
APPLICATION FILED JAN. 26, 1920.

1,357,136.

Patented Oct. 26, 1920.
2 SHEETS—SHEET 2.

Inventor:
E. R. Avery.
by Wilkinson & Ginota.
Attorneys.

UNITED STATES PATENT OFFICE.

EDWARD R. AVERY, OF THREE FORKS, MONTANA.

WHEEL-PULLER.

1,357,136. Specification of Letters Patent. Patented Oct. 26, 1920.

Application filed January 26, 1920. Serial No. 354,093.

*To all whom it may concern:*

Be it known that I, EDWARD R. AVERY, a citizen of the United States, residing at Three Forks, in the county of Gallatin and State of Montana, have invented certain new and useful Improvements in Wheel-Pullers; and I do hereby declare the following to be a full, clear, and exact description of the invention, such as will enable others skilled in the art to which it appertains to make and use the same.

The present invention relates to improvements in wheel pullers, and has for an object to provide an improved device more especially adapted for removing the rear wheels from automobiles and like vehicles, where difficulties are encountered by reason of the axle and differential housings.

Another object of the present invention resides in providing an improved wheel puller which will be constructed for ready application to the wheel to be removed, and which when not in use may be collapsed into small compass so as to be readily packed away and easily carried on the automobile.

In the accompanying drawings forming a part of this application, and in which similar reference symbols indicate corresponding parts in the several views.

Referring more particularly to the drawings, wherein only a single embodiment of the invention is shown, 1 designates an axle having a tapering portion 2, over which the hub of the wheel, indicated at 3, is mounted. The wheel 3 carries the usual screw threaded hub projection 4 adapted to receive the well known hub cap, which closes the end of the wheel hub, conceals the end of the axle, and prevents the entrance of foreign matter.

Figure 4:
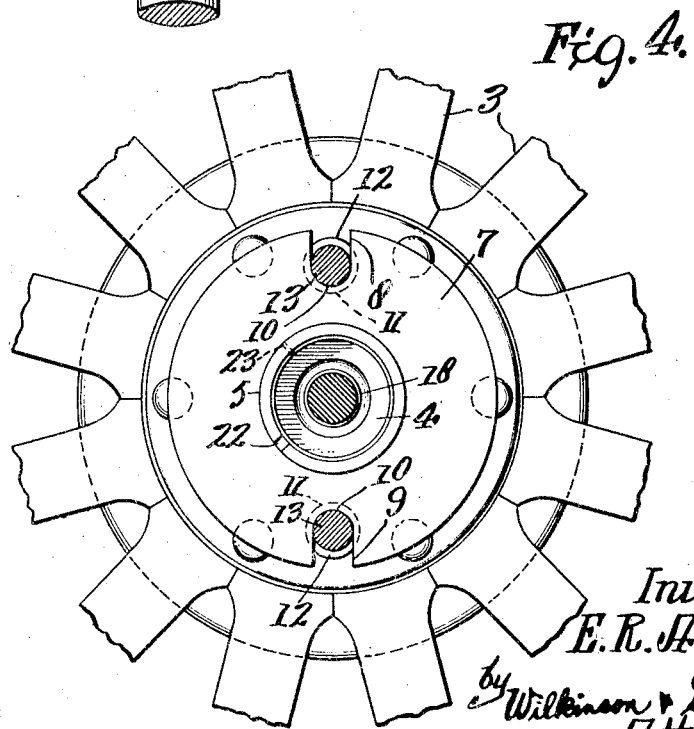
Fig. 4 is a cross sectional view taken on the line 4—4 in Fig. 2.

The improved wheel puller embodies a cap 5 adapted to be screwed onto the threaded hub extension 4 after the usual hub cap is removed, and this cap 5 is formed with a conical outer surface 6 conforming to a similar conical opening provided centrally in an inner plate 7, which may be of the circular shape shown in Fig. 4.

The plate 7 is provided with notches 8 and 9, preferably at diametrically opposite points, although these notches may be placed elsewhere and may be provided in any suitable numbers. The inner portions of the notches 8 and 9 are formed with depressions 10 forming beveled shoulders 11 adapted to coöperate with enlarged heads 12 formed on bolts 13 which extend at right angles to the plate 7 and have their shanks projecting forwardly beyond said plate. The outer ends of the bolts 13 are formed with similar heads 14 which lie in depressions 15 of notches 16 provided in an outer plate 16'.

Figure 1:
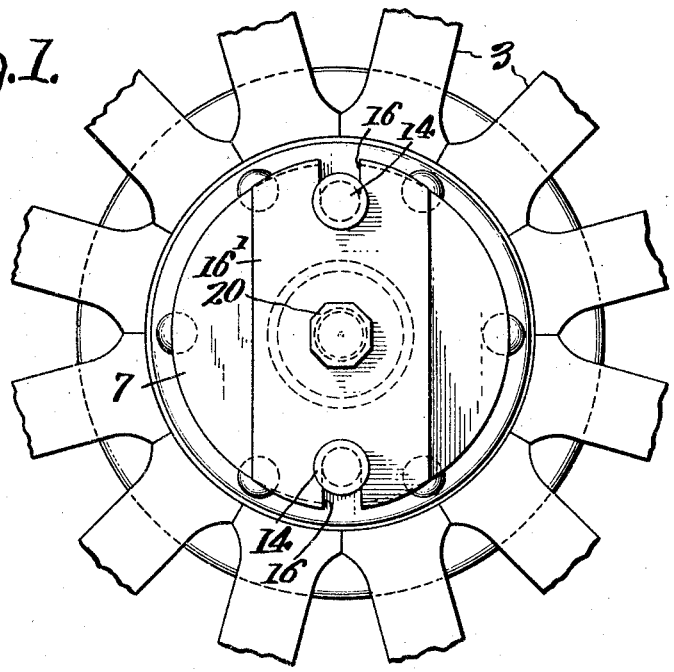
Figure 1 is a front elevational view of a wheel, partly broken away and showing an improved wheel puller constructed according to the present invention applied thereto.
Figure 2:
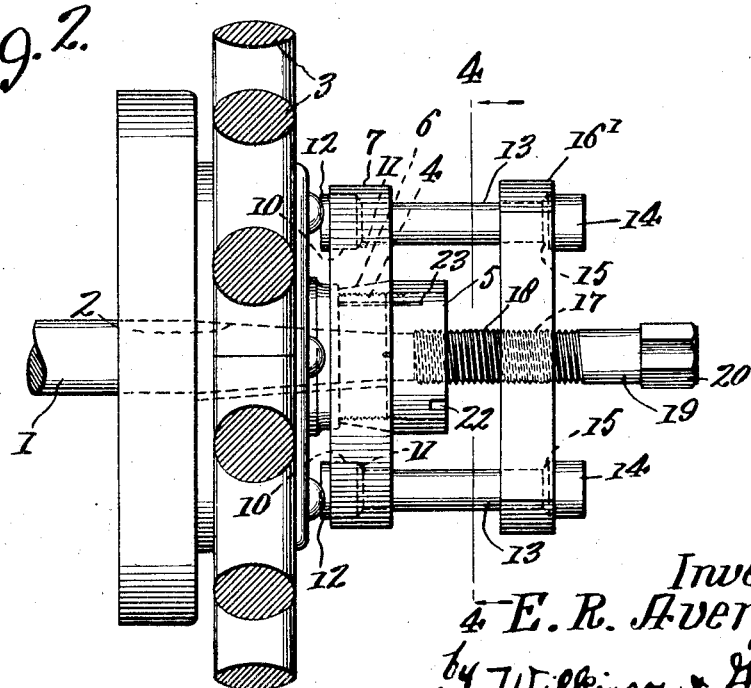
Fig. 2 is a side elevational view of the same.

A centrally threaded perforation 17 is made in the plate 16' to receive the screw threaded shank 18 of a bolt 19 having a hexagonal or other shaped head 20 to facilitate grasping by the hand or a tool for the purpose of rotating the bolt. The plate 16' is preferably of the rectangular form shown in Fig. 1, although it may be made circular as the plate 7, or of any other configuration. The inner end of the bolt 19 is provided with a projection 21 adapted to fit in the usual socket provided in the outer end of the axle 1.

The sleeve or cap 5 is formed with notches 22 for receiving a tool whereby the cap may be screwed on the threaded extension 4, and furthermore the cap 5 is preferably slitted, as indicated at 23, to admit contraction thereof when the conical opening in the plate 7 rides over the conical face 6 of said cap. This causes the cap 5 to tightly embrace the screw threads on the hub extension 4, preventing possible displacement or rotation thereof.

Figure 3:
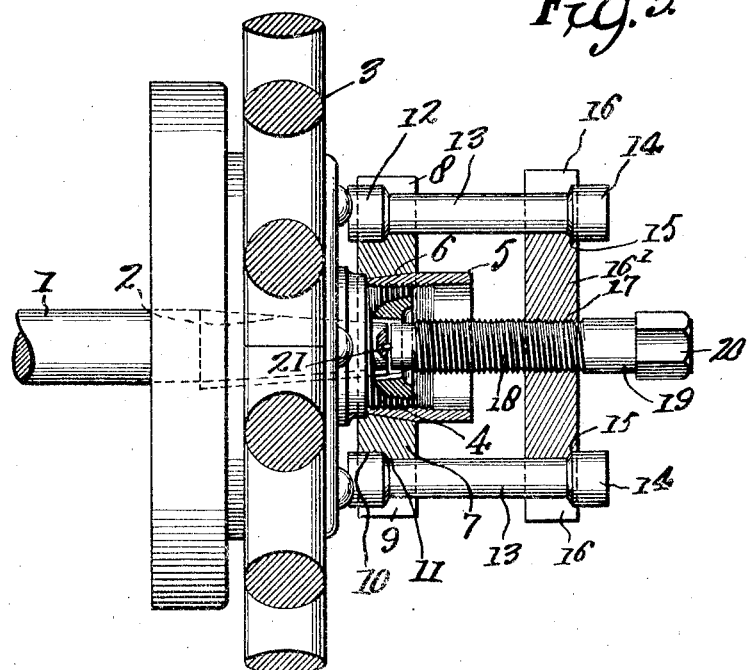
Fig. 3 is a view of the wheel and associated parts as shown in Fig. 2, with the improved wheel puller shown in section.

In use, the usual hub cap is first unscrewed from the hub extension 4 and the plate 7 is thereupon slipped over such extension. The cap 5 is thereupon threaded on the extension 4, the conical outer surface 6 fitting into the opening of said plate, substantially as shown in Fig. 3. The bolt 19 is then fitted up against the outer end of the axle 1 with the projection 21 occupying the socket and the bolts 13 are placed within the notches in the plates 6 and 7 with the bolt heads occupying the depressions in the opposite ends of said notches. The bolt 19 is then rotated, and, by reason of its engagement with the outer end of the axle 1, the bolt will be prevented from moving axially, and it will therefore feed the plate 16' along the same. The lower bolt 13 may be held in place until sufficient pressure is exerted thereupon to maintain the same in place. The rotation of the bolt in a proper direction with respect to the direction of the screw threads thereon, will cause the movement of the outer plate 16' away from the wheel, which will result in drawing the bolts 13 and the inner plate 17 also outwardly from the axle.

The engagement of the conical opening in the plate 7 with the conical surface 6 of the cap 5 will cause the drawing of the cap 5 along with the plate 7, and the screw threaded engagement of the cap with the hub extension of the wheel will cause the movement of such hub extension and wheel 3 with the cap 5 and other movable parts of the improved wheel puller. The result will be that the wheel 3 will be drawn axially from the axle 1. The screw bolt 19 affords the necessary high development of pulling force necessary to dislodge and remove the wheel, while allowing of the rotation of the bolt by the application of but very little force.

When not in use the bolts 13 may be removed from the plates 7 and 16' and the plates may be collapsed together, the hub cap 5 and bolt 19, of course, being removed therefrom.

It is obvious that those skilled in the art may vary the details of construction and arrangements of parts without departing from the spirit of my invention, and therefore I do not wish to be limited to such features except as may be required by the claims.

I claim:

1. In combination with a vehicle axle and a wheel carried thereby having a hub extension, of a cap adapted to engage with said hub extension, a plate engageable with said cap, a second plate spaced from said first named plate, means for causing the movement of said second-named plate, and removable means adapted to be connected to both of said plates for causing the movement of the first-mentioned plate together with the second plate, substantially as described.

2. In combination with an axle and a wheel carried thereby having a threaded hub extension, of a cap adapted to be removably threaded upon said hub extension and having an outer conical portion, an inner plate having a conical opening closely fitting the conical portion on said cap, an outer plate, means engageable with said outer plate and the axle for causing the movement of said outer plate, and removable means connecting said inner and outer plates, substantially as described.

3. In combination with a vehicle axle and a wheel carried thereby having a hub extension, of a cap removably connected to said hub extension, an inner plate having connection to said cap and provided with notches therein, an outer plate, means carried by said outer plate for engaging with the end of the axle whereby to shift the outer plate in an outward direction, said outer plate also having notches therein, and headed bolts fitted in said plates, substantially as described.

4. In combination with a vehicle axle, and a wheel carried thereby having a hub extension, of a cap removably mounted on said hub extension and having an inclined outer surface, an inner plate having an inclined opening snugly fitting the inclined outer surface on said cap and provided with notches opening on its periphery, an outer plate also having peripheral notches in alinement with the notches in the inner plate, bolts extending between said plates and provided with heads engaged in said notches, and means carried by said outer plate for engaging with the axle hub to shift the plates in a direction away from the axle, substantially as described.

5. In combination with a vehicle axle and a wheel carried thereby having a threaded hub extension, a cap threaded on said extension and provided with an outer conical surface and slits made longitudinally in the cap and running through said conical surface, means engageable by a tool for turning the cap on the hub extension, an inner plate having a conical opening adapted to fit the conical surface on said cap, an outer plate, removable means between said plates, and means carried by the outer plate for engaging the end of the axle to shift the plates outwardly from the axle, substantially as described.

6. In combination with an axle having a socketed end and a wheel carried thereby having a hub extension, a cap removably connected with the hub extension, an inner plate engaged with said cap, an outer plate, means connecting said plates, and a screw threaded bolt passing through said outer plate and having a projection engaging in the socketed end of the axle for moving the plates away from the axle, substantially as described.

EDWARD R. AVERY.